May 28, 1968     E. FURRER     3,384,995
SLIDING DOOR FOR AUTOMOBILES
Filed May 19, 1966
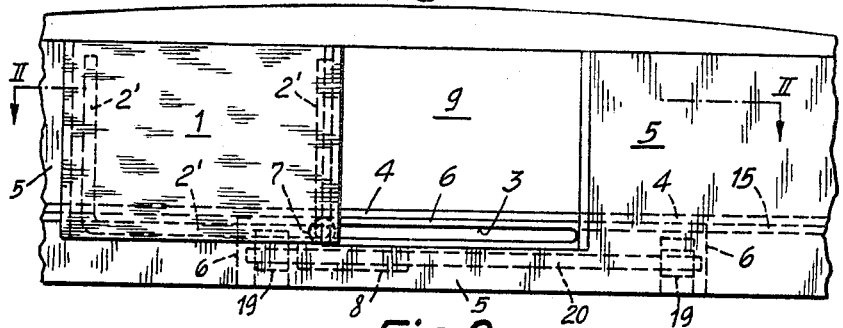
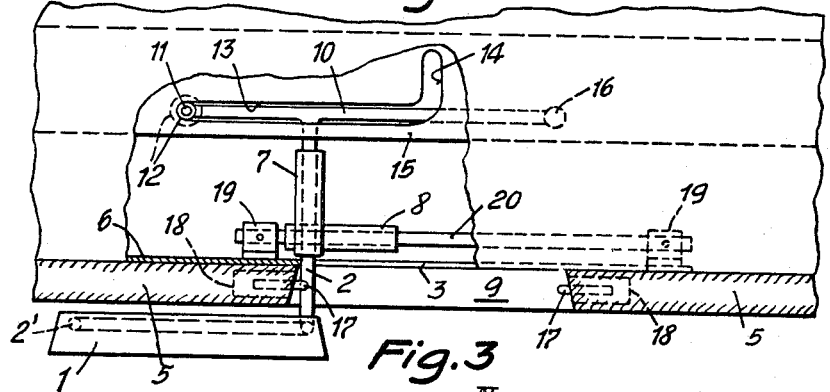
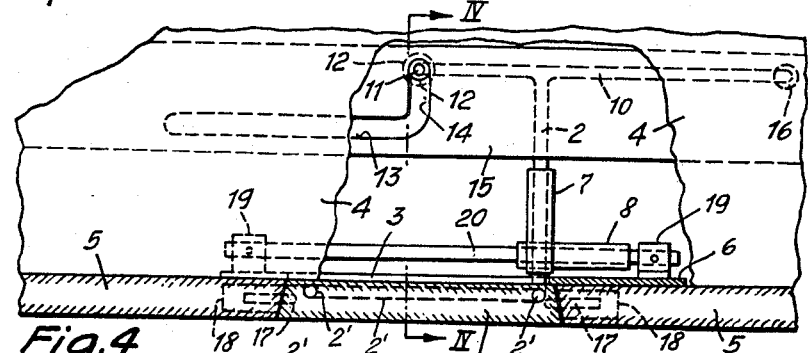
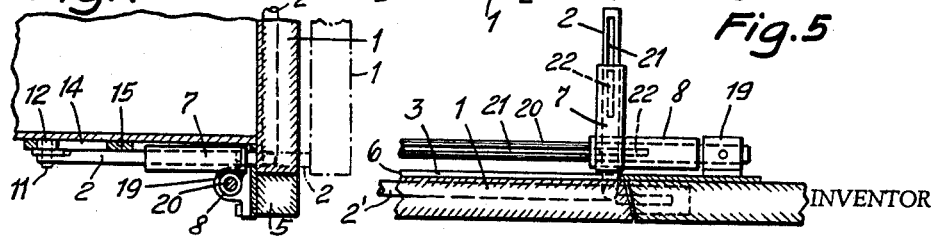
INVENTOR
ERICH FURRER
BY Lowry & Rinehart
ATTORNEYS United States Patent Office 3,384,995
Patented May 28, 1968

3,384,995
SLIDING DOOR FOR AUTOMOBILES
Erich Furrer, 35 Rosenweg, 4500 Solothurn, Switzerland
Filed May 19, 1966, Ser. No. 551,412
7 Claims. (Cl. 49—213)

ABSTRACT OF THE DISCLOSURE

A sliding door assembly for a vehicle body wherein no visible slots are necessary to enable the said door to function properly. A cantilever is attached at one end to the said door of a vehicle body and is engaged at the other end with a movable guide member which travels a closed path provided underneath the vehicle body and also provides an abutting member which acts to balance the weight of the door mounted at the other end of the cantilever. The arrangement of the sliding door assembly enables the door of the vehicle to move transversely and longitudinally, thereby overcoming all disadvantages accompanying the swinging door of a vehicle body.

Specification

The conventional doors on automobiles involve various dangers and disadvantages. On parking lots for example, adjacent cars often are damaged by doors swinging open on parked cars. Likewise, opening the doors on a car when getting into or out of a car in street traffic, often has caused accidents. Moreover, most of the wing or swing doors on being slammed cause too much noise, and these doors further require too much space.

Of late it has been the object of car makers to eliminate said danger sources and disadvantages by means of sliding doors. In the case of auto sliding doors known so far which are disengageable transversely from the door opening and then longitudinally displaceable, the car-body is disfigured by guide rails or grooves which are visible when the door is closed.

My present invention relates to a car sliding door by which the above-mentioned disadvantages inherent in constructions known so far shall be eliminated. The sliding door of the invention is distinguished by the fact that the door which is transversely and longitudinally displaceable, comprises an inwardly directed carrier or cantilever that passes through a slot which is masked when the door is closed. Said cantilever is mounted on spaced parallel guide elements and is longitudinally and at the same time transversely movable thereon. One of said guide elements comprises means for bringing an interlocking member provided on the cantilever into engagement when the door is moved inwardly, and for locking said member against longitudinal displacement.

Brief description of the drawing

One form of the invention is shown in the drawing, in which—

FIG. 1 is a side view of the sliding door in the open state,

FIG. 2 is a top plan view of FIG. 1 on the line II—II thereof, the car floor having been partly broken away, FIG. 3 is a plan view similar to FIG. 2, but when the door is closed, FIG. 4 is a cross-section on the line IV—IV of FIG. 3, and FIG. 5 shows a modification of FIG. 3.

Description of a specific embodiment

The sliding door 1 shown is rigidly connected to a framelike member 2' of a cantilever 2 that extends transversely to the longitudinal direction of the car. Cantilever 2 passes through a longitudinal slot 3 of a vertical plastic fairing 6 that is secured to the inside of the car-body 5 and connected to the car-floor 4 and is masked by the door 1 when the latter is closed. Cantilever 2 is movably guided in a bushing 7 of a crosshead 7, 8 for the purpose of removing the door 1 a short way from the opening 9 in a movement parallel to itself. Bushing 8 of the crosshead 7, 8 is guided on a longitudinal rod 20 that is spaced from inside of the car-body and is mounted in two brackets 19 fixed to the car-body. The slide path of the door or of the crosshead 7, 8 is limited by the brackets 19.

To the inner end of cantilever 2 is secured a horizontal, longitudinally extending bar 10, and on the left-hand and relatively short arm of the latter is pivoted a roller 12 on a pin 11. Roller 12 is engaged in a rectangular guide slot 13, 14 of a plate 15 fixed to the underside of floor 4. A slide knob 16 is provided on the free end of the right-hand and longer arm of bar 10 and abuts against the underside of plate 15. Bar 10 thus is coercively guided by the roller 12 on one hand and by the slide knob 16 on the other so that the cantilever 2 will not be twisted. The slot 13 as well as the guide slot 3 of fairing plate 6 serve for limiting the slide path of door 1. The transverse groove 14 adjoining one end of groove 13 permits the transverse displacement of cantilever 2 and, thus, of door 1 so that the latter may be moved into and from the door opening 9. When, by inward movement, pivot pin 11 is engaged in groove 14, as shown in FIG. 3, groove 14 and thereby cantilever 2 with door 1 is secured against longitudinal displacements. To hold door 1 in the closed position so as to render impossible longitudinal and transverse movements thereof, two locking bolts 17 are provided which are controlled by two magnet systems 18 embodied in vertical parts of the door frame (FIGS. 2 and 3). The sliding door described is manually actuable, but may be adapted to be controlled by electromechanical means and push-button actuation.

For positively mounting the cantilever 2 in the guide bushing 7 of the crosshead 7, 8 on one hand and in the slide bushing 8 thereof on the fixedly mounted rod 20 on the other hand, there could be provided longitudinal guide grooves 21 on cantilever 2 and rod 20 and sliding keys 22 engaged therein, as shown in FIG. 5.

In the case of heavy or large doors it would be feasible to mount an additional guide rod that would run parallel to the longitudinal guide rod 20. The sliding door described is suited for vehicles of all types and kinds, in particular for automobiles.

While the invention has been described in detail with respect to a now preferred example and embodiment of the invention it will be understood by those skilled in the art after understanding the invention, that various changes and modifications may be made without departing from the spirit and scope of the invention and it is intended, therefore, to cover all such changes and modifications in the appended claims.

Having thus described my invention, I claim as new and desire to secure by Letters Patent:

1. A sliding door assembly for a vehicle body comprising:
    (a) a transversely and longitudinally displaceable door;
    (b) a cantilever having an inner end and an outer end and extending transversely to the longitudinal direction of said body;
    (c) means connecting said outer end of said cantilever to said door;
    (d) a first guide member mounted on said body;
    (e) means longitudinally movable on said first guide member providing longitudinal displacement to said cantilever;

(f) means fixedly mounted on said longitudinally movable means, said fixedly mounted means including means movably containing said cantilever for guiding transverse displacement of said cantilever;

(g) a horizontal, longitudinally extending bar mounted at said inner end of said cantilever, said bar having a shorter arm and a longer arm extending from point of connection with said cantilever; and (h) a second guide member mounted inwardly of said first guide member underneath said body, said second guide member including a means defining a continuous closed path within which is engaged a movable means mounted on said shorter arm of said horizontal bar;

(i) said second guide means further including a bearing surface means abutted by a sliding means mounted on said longer arm of said horizontal bar;

(j) said closed path having a longer part parallel to said longitudinal direction of said body and a shorter portion substantially perpendicular to said longer portion.

2. The sliding door assembly as defined in claim 1 wherein the said first guide member is a rod and said movable means on said first guide member is a slide bushing.

3. The sliding door assembly as defined in claim 1 wherein said second guide member is a plate and said means defining a continuous closed path is a slot in said plate.

4. The sliding door assembly as defined in claim 2 wherein said second guide member is a plate and said means defining a continuous closed path is a slot in said plate.

5. The sliding door assembly as defined in claim 2 wherein the said fixedly mounted means is a guide bushing thereby forming a crosshead.

6. The sliding door assembly as defined in claim 4 wherein said movable means of said shorter arm is a roller.

7. The sliding door assembly as defined in claim 5 wherein said cantilever is a rod having longitudinal guide grooves said first guide member rod has longitudinal guide grooves and said bushings include keys which engage said rod guide grooves.

References Cited

UNITED STATES PATENTS 2,589,493    3/1952    Henry _____ 49—221
3,230,585    1/1966    Marsh _____ 49—214

KENNETH DOWNEY, *Primary Examiner.*